3,275,835
PHOTOSENSITIVE ACCELEROMETER UTILIZING RADIATION PRESSURE
Stanley R. Morrison, Hopkins, Minn., assignor to Honeywell Inc., a corporation of Delaware
Filed Jan. 27, 1964, Ser. No. 340,209
11 Claims. (Cl. 250—231)

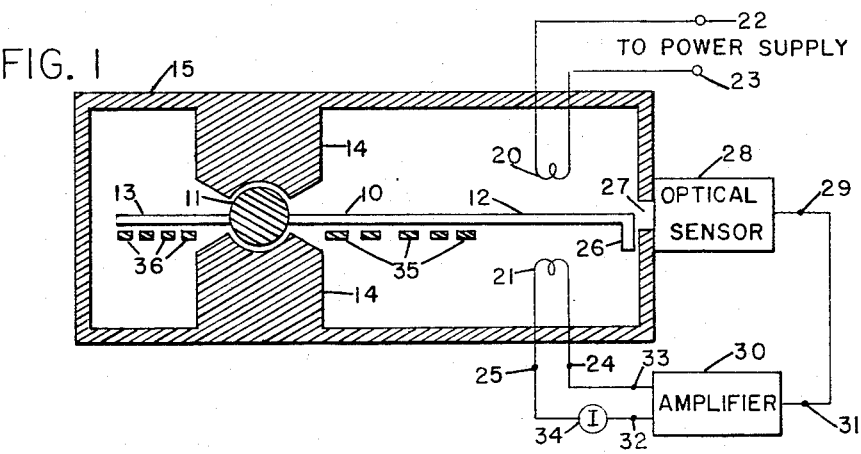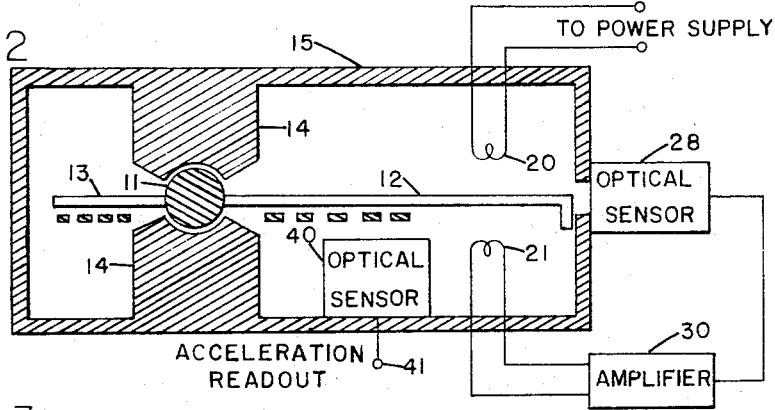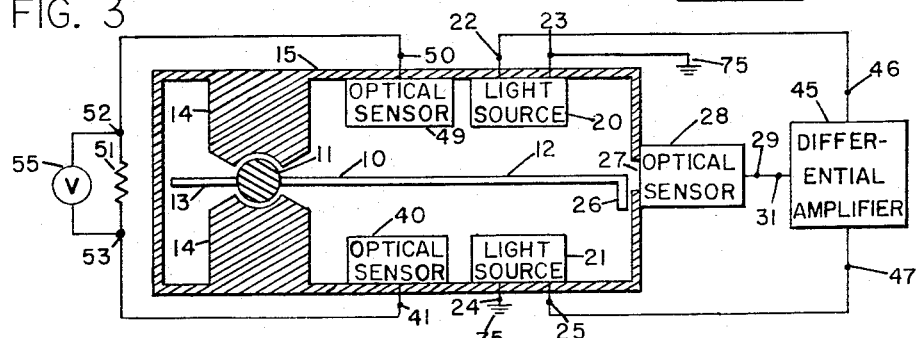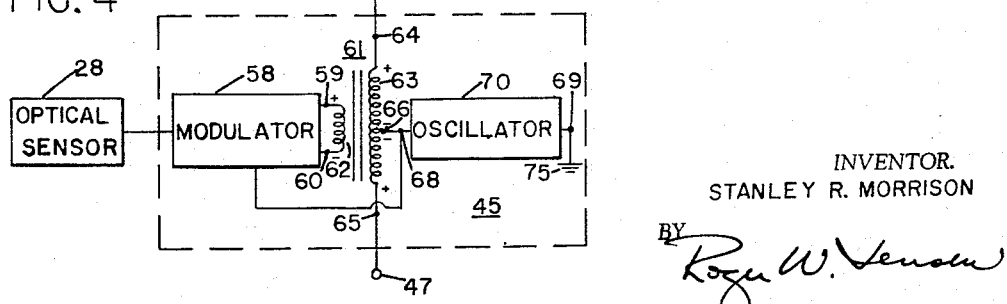
INVENTOR.
STANLEY R. MORRISON
ATTORNEY

United States Patent Office 3,275,835
Patented Sept. 27, 1966

This invention pertains to inertial instruments. More particularly the present invention pertains to accelerometers.

The recent advances in related fields of technology have given rise to need for an extremely sensitive and accurate accelerometer having a capability of detecting accelerations of $10^{-8}$ g or better. The invention described herein provides such an instrument by utilizing the minute forces produced by light pressure as the rebalance forces in a pendulous accelerometer. Normal light pressures are $10^{-5}$ to $10^{-6}$ dynes/cm.$^2$, which, acting on a mass of 1 gram will provide about $10^{-8}$ to $10^{-9}$ g's acceleration. Light pressure, therefore, appears well suited for this application, as the pressures produced are of exactly the right order of magnitude to cover the desired range of acceleration detection.

Briefly the apparatus comprises an elongated inertial member support to rotate freely about an axis removed from the center of mass of the member. Any external force acting on the instrument will tend to cause rotation of the member about its axis of support away from the desired central position. A pair of sources of optical radiation are disposed, one on each side of the member, at the free end of the member and are adapted to apply pressure on the member along the direction of free motion of the member. By means of a pickoff the motion of the member is sensed. The output of the pickoff is used to regulate the intensity of the light at each source of optical radiation and in turn to control the pressure on the member in a way to restore the member to the desired central position. The relative intensities of the two light sources provide the measure of acceleration on the instrument.

A number of alternate means for measuring the intensity or pressure of the light are available. The intensity of the light is proportional to the energizing current and, therefore, the measurement of the current will provide an indication of acceleration. An alternate possibility is to measure the light intensity directly using optical sensors or detectors.

It is therefore an object of the present invention to provide an improved accelerometer.

A more specific object of the present invention is to provide a highly sensitive accelerometer capable of measuring extremely low forces.

These and further objects will be understood more clearly upon inspection of the following specification, claims, and drawings in which:

FIGURE 1 is a schematic diagram depicting a first embodiment of the present invention utilizing the measurement of current as acceleration readout;

FIGURE 2 is a schematic diagram depicting a second embodiment of the invention, obtaining its acceleration output from an optical sensor measuring the light intensity of the rebalancing light source;

FIGURE 3 is a schematic diagram of still another embodiment of the present invention; and FIGURE 4 is a circuit diagram of a differential amplifier which may be used in the control circuit of FIGURE 3.

Referring now to FIGURE 1 an inertial member 10 has its pivot 11 mounted on a support 14. Support 14 in turn is attached to housing 15. Inertial member 10 further has a vane 12 and a balance arm 13. The vane 12 and the balance arm 13 extend horizontally away from the pivot in opposing directions. Vane 12, which in FIGURE 1 is shown extending to the right of the pivot, is free to move in a vertical plane perpendicular to an axis through pivot 11. Vane 12 at its extreme portion away from the pivot is defined by a flat surface exposing a plane area to the direction of motion. A light source 20 is mounted on housing 15 directly above the plane surface portion of vane 12 and a light source 21 is mounted on housing 15 directly below the flat surface portion of vane 12. Lamp 20 has terminals 22 and 23 which in the normal operation are connected to a source of substantially constant potential.

Housing 15 has an aperture 27 adjacent the extreme end of vane 12. Vane 12 has at its extreme end, adjacent to aperture 27, a light stop 26 with a surface adjacent and parallel aperture 27 and capable of either partially or completely closing aperture 27, depending on the angular position of vane 12. In its normal or null position light stop 26 covers approximately one-half of aperture 27.

Immediately adjacent aperture 27, and outside of housing 15, is located an optical sensor 28 adapted to sense the light coming through aperture 27. Optical sensor 28 has an output terminal 29 which is connected directly to an input terminal 31 of an amplifier 30. Amplifier 30 has output terminals 32 and 33. Output terminal 33 being connected to terminal 24 of light source 21 while output terminal 32 is connected to terminal 25 of light source 21 through a current sensing means 34.

The intensity of light source 20 remains substantially constant throughout the normal operation of the accelerometer while the intensity of light source 21 varies with the position of vane 12. As vane 12 moves up, the light entering aperture 27 decreases and the signal at the output 29 of optical sensor 28 also decreases. In consequence the signal entering amplifier 30 at its input terminal 31 decreases decreasing also the signal between output terminals 32 and 33. As a result the light intensity at source 21 decreases and the light pressure, associated with the light intensity, allowing vane 12 to move downward. In the same manner, if the vane moves downward the amount of light entering aperture 27 increases and the intensity of light at source 21 increases correspondingly. The increased pressure of light from source 21 acts to push vane 12 in the upward direction. The gain of amplifier 30 is set such that when no external forces act on vane 12 light stop 26 covers approximately one-half of the aperture. The intensity of light at source 21 is proportional to the acceleration sources acting on vane 12 and is also proportional to the current supplied from amplifier 30 and measured by current measuring means 34. The variations in the current, as measured by measuring means 34, correspond to the variations in acceleration.

The apparatus in FIGURE 1 also shows a grid 35 attached to housing 11 and located under vane 12, and a grid 36 mounted on housing 15 and under balance arm 13. The purpose of grids 35 and 36 is to support the vane during large accelerations.

FIGURE 2 is similar to FIGURE 1 in all respects with the exception that the function of current measuring means 34 of FIGURE 1 is in FIGURE 2 assumed by an optical sensor 40 mounted on housing 15 adjacent light source 21 and adapted to measure the light intensity of source 21. Optical sensor 40 has an output terminal 41 which provides the acceleration readout.

FIGURE 3 is also similar to FIGURE 1. In FIGURE 3, however, both light sources are regulated to provide additional control. The output of optical sensor 28 is fed into a differential amplifier 45 at its input terminal 31. Differential amplifier 45 has output terminals 46 and 47. Output terminal 46 of amplifier 45 is connected to input terminal 22 of light source 20 and output terminal 47 of amplifier 45 is connected to input terminal 25 of light source 21. Terminals 23 of light source 20 and 24 of light source 25 are connected directly to ground 75. The operation of differential amplifier 45 is such that when the output signal from optical sensor 28 increases the signal at output terminal 47 of differential amplifier 45 also increases, while the signal at output terminal 46 decreases. The inverse is true when the signal from the optical sensor decreases. Since both light sources are regulated it is also necessary to measure the intensity of both sources. For that purpose an additional optical sensor 49 is mounted on housing 15 adjacent light source 20 to sense the intensity of source 20. Optical sensor 49 has an output terminal 50 connected directly to a terminal 52. Terminal 52 is the end terminal of a resistor 51 which at its other has a terminal 53. Terminal 53 of resistor 51 is connected directly to output terminal 41 of optical sensor 40. A voltage measuring device 55 is connected between terminals 52 and 53 of resistor 51 and provide an indication of the difference of signals appearing at output terminals 41 and 50 of optical sensors 40 and 49 respectively. The difference in signals at terminals 41 and 50 is indicative of the acceleration of housing 15.

The differential amplifier 45 in FIGURE 3 could be one of any prior art devices well known to those skilled in the art. One possible arrangement is shown in FIGURE 4 where the output of sensor 28 is connected to the input of a modulator 58. Modulator 58 has output terminals 59 and 60. Output terminals 59 and 60 of modulator 58 are connected to the end terminals of a primary winding 62 of a transformer 61. Transformer 61 also has a secondary winding 63 with end terminals 64 and 65 and a center tap 66. End terminal 64 of winding 63 is connected to an output terminal 46 and end terminal 65 is connected to an output terminal 47. Center tap 66 of winding 63 is connected to an output terminal 68 of an oscillator 70. Oscillator 70 also has an additional output terminal 69 connected directly to ground 75. The signal from oscillator 70 is also fed as a reference signal to modulator 58.

The operation of the circuit in FIGURE 4 is such that for an increase in the output signal of sensor 28 the signal at output 47 of differential amplifier 45 increases while the signal at output terminal 46 correspondingly decreases. The inverse is true when the output signal from sensor 28 decreases.

Many variations are possible within the spirit of this invention. For example, the optical pickoff arrangement comprising optical sensor 28, aperture 27, light stop 26, and light source 20 could be replaced by other means. The optical pickoff could have its own light source so as to be independent of the light intensity of light source 20. Optical pickoffs are widely used in prior art devices and are well known to those skilled in the art. Also, the term "light" is not limited to the visible light above, but is intended to include the entire electromagnetic wave spectrum.

For the successful operation of the present invention it is necessary that pivot 11 be substantially frictionless. The present invention is not limited to any particular type of support for the pivot 11, it is suggested, however, that for a minimum friction the pivot could be supported by electric or magnetic fields.

It is intended therefore that the particular embodiment of the present invention shown in the drawings be for illustration purposes only and that the present invention be limited only by the scope of the appended claims.

What is claimed is:
1. An accelerometer comprising:
a housing;
a support positioned within said housing;
an inertial member mounted on said support for at least one degree of free motion, said member having a preferred normal position relative to said housing;
means for applying a rebalance force on said member to return said member to said preferred normal position when, due to external forces on the housing, said member is displaced away from said preferred position, said means including,
    at least one source of radiation adapted to apply pressure on said member along the line of free motion of said member,
    a pickoff means mounted on said housing for detecting the motion of said member away from said preferred position, and
    energizing means connected to said source of radiation, said energizing means being adapted to receive a signal from said pickoff means and to regulate the amount of radiation from said source in such a way as to maintain said member in said preferred normal position; and
radiation sensing means adapted to measure the amount of radiation originating from said source, said measurement of radiation being indicative of the acceleration of said housing due to external forces.

2. Inertial apparatus comprising:
a support;
an inertial member member mounted on said support for movement with respect to an axis, said member having a preferred normal position relative to said support;
means for applying rebalance forces on said member to return said member to said preferred normal position when, due to external forces on said support, said member is displaced away from said preferred position, said means including,
    a first and a second source of radiation, said sources being disposed on diametrically opposite sides of said member,
    a pickoff means mounted on said housing for detecting the motion of said member with respect to said axis away from said preferred position, and
    energizing means connected to said first and said second source of radiation, said energizing means being adapted to receive a signal from said pickoff means and to regulate the amount of radiation from said sources in such a way as to maintain said member in said preferred normal position; and
additional means connected to said rebalance means for producing signals.

3. An accelerometer comprising:
a housing;
a support positioned within said housing;
an inertial member mounted on said support for at least one degree of free motion, said member having a preferred normal position relative to said housing;
means for applying rebalance forces on said member to return said member to said preferred normal position when, due to external forces on the housing, said member is put in motion away from said preferred position, said means including,
    a first and a second source of radiation, said sources being disposed on diametrically opposite sides of said member along the line of free motion of said member,
    a pickoff means mounted on said housing for detecting the motion of said member away from said preferred normal position, and
    energizing means connected to said first and said second source of radiation, said energizing means being adapted to receive a signal from said pickoff means and to regulate the amount of radiation from said sources in such a way as to maintain said member in said preferred normal position; and radiation sensing means adapted to measure the amount of radiation originating from each said source, said measurement of radiation being indicative of the acceleration of said housing due to external forces.

4. An accelerometer comprising:

a housing;

a support positioned within said housing;

an inertial member mounted on said support for at least one degree of free motion, said member having a preferred normal position relative to said housing;

means for applying rebalance forces on said member to return said member to said preferred normal position when, due to external forces on the housing, said member is put in motion away from said preferred position, said means including, a first and a second source of electromagnetic radiation, said sources being disposed on diametrically opposite sides of said member along the line of free motion of said member, a pickoff means mounted on said housing for detecting the motion of said member away from said preferred normal position, and energizing means connected to said first and said second source of electromagnetic radiation, said energizing means being adapted to receive a signal from said pickoff means and to regulate the amount of radiation from said sources in such a way as to maintain said member in said preferred normal position; and radiation sensing means adapted to measure the amount of radiation originating from each said source, said measurement of radiation being indicative of the acceleration of said housing due to external forces.

5. An accelerometer comprising:

a housing;

a support positioned within said housing;

an inertial member mounted on said support for at least one direction of free motion, said member having a preferred normal position relative to said housing;

means for applying rebalance forces on said member to return said member to said preferred normal position, when due to external forces on the housing, said member is put in motion away from said preferred position, said means including, a first and a second light source, said sources being disposed on diametrically opposite sides of said member along said direction of free motion of said member, a pickoff means mounted on said housing for detecting the motion of said member away from said preferred normal position, and energizing means connected to said first and said second light source, said energizing means being adapted to receive a signal from said pickoff means and to regulate the intensity of light at each said source in such a way as to maintain said member in said preferred normal position; and light sensing means adapted to measure the intensity of light at each said source, said measurement of light intensity being indicative of the acceleration of said housing due to external forces.

6. An accelerometer comprising:

a housing;

a pendulous member supported within said housing and adapted to rotate freely about a first axis at a distance from the center of mass of said member, said member having a preferred angular position relative to said housing;

means for applying rebalance forces on said member to return said member to said preferred angular position, when due to external forces on the housing, said member is put in motion away from said preferred position, said means including, a first and a second source of radiation, said sources being disposed on diametrically opposite sides of said member along a second axis passing through said member at a distance away from said first axis and oriented substantially normal to said first axis, a pickoff means mounted on said housing for detecting the motion of said member away from said preferred normal position, and energizing means connected to said first and said second source of radiation, said energizing means being adapted to receive a signal from said pickoff means and to regulate the amount of radiation from said sources in such a way as to maintain said member in said preferred normal position; and radiation sensing means adapted to measure the amount of radiation originating from each said source, said measurement of radiation being indicative of the acceleration of said housing due to external forces.

7. An accelerometer comprising:

a housing;

a pendulous member supported within said housing and adapted to rotate freely about a first axis at a distance from the center of mass of said member, said member having a preferred angular position relative to said housing;

means for applying rebalance forces on said member to return said member to said preferred angular position, when due to external forces on the housing, said member is put in motion away from said preferred position, said means including, a first and a second source of electromagnetic radiation, said sources being disposed on diametrically opposite sides of said member along a second axis passing through said member at a distance away from said first axis and oriented substantially normal to said first axis, a pickoff means mounted on said housing for detecting the motion of said member away from said preferred normal position, and energizing means connected to said first and said second source of electromagnetic radiation, said energizing means being adapted to receive a signal from said pickoff means and to regulate the amount of radiation from said sources in such a way as to maintain said member in said preferred normal position; and radiation sensing means adapted to measure the amount of radiation originating from each said source, said measurement of radiation being indicative of the acceleration of said housing due to external forces.

8. An accelerometer comprising:

a housing;

a pendulous member supported within said housing and adapted to rotate freely about a first axis at a distance from the center of mass of said member, said member having a preferred angular position relative to said housing;

means for applying rebalance forces on said member to return said member to said preferred angular position, when due to external forces on the housing, said member is put in motion away from said preferred position, said means including, a first and a second light source, said sources being disposed on diametrically opposite sides of said member along a second axis passing through said member at a distance away from said first axis and oriented substantially normal to said first axis, a pickoff means mounted on said housing for detecting the motion of said member away from said preferred normal position, and energizing means connected to said first and said second light source, said energizing means being adapted to receive a signal from said pickoff means and to regulate the intensity of the light of said sources in such a way as to maintain said member in said preferred normal position; and light sensing means adapted to measure the intensity of light at each said source, said measurement of light being indicative of the acceleration of said housing due to external forces.

9. Acceleration responsive apparatus comprising:

a housing;

an elongated intertial member pendulously supported within said housing and adapted to rotate freely about a pivot at one end of said member, said member having its free end defined by two parallel flat surfaces lying in a plane normal to the direction of free motion of said member, said member also having a preferred normal position relative to said housing;

means for supplying restoring forces on said member to return the free end of said member to said preferred position when external forces cause the rotation of said member, said means including, a first and a second source of radiation, one of said sources disposed on each side of said plane surface portion of said member, a pickoff means mounted on said housing for detecting the angular displacement of said member about said pivot, and energizing means connected to said first and said second source of radiation, said energizing means being adapted to receive a signal from said pickoff means and to regulate the amount of radiation from each said source in such a way as to maintain said member in the desired position; and rediation sensing means adapted to measure the amount of radiation originating from each said radiation source, said measurement of radiation being indicative of the acceleration of said housing due to an external force.

10. Acceleration responsive apparatus comprising:

a housing;

an elongated inertial member pendulously supported within said housing and adapted to rotate freely about a pivot at one end of said member, said member having its free end defined by two parallel flat surfaces lying in a plane normal to the direction of free motion of said member, said member also having a preferred normal position relative to said housing;

means for supplying restoring forces on said member to return the free end of said member to said preferred position when external forces cause the rotation of said member, said means including, a first and second source of electromagnetic radiation, one of said sources disposed on each side of said plane surface portion of said member, a pickoff means mounted on said houisng for detecting the angular displacement of said member about said pivot, and energizing means connected to said first and said second source of electromagnetic radiation, said energizing means being adapted to receive a signal from said pickoff means and to regulate the amount of radiation from each said source in such a way as to maintain said member in the desired position; and radiation sensing means adapted to measure the amount of radiation originating from each said radiation source, said measurement of radiation being indicative of the acceleration of said housing due to an external force.

11. Acceleration responsive apparatus comprising:

a housing;

an elongated intertial member pendulously supported within said housing and adapted to rotate freely about a pivot at one end of said member, said member having its free end defined by two parallel flat surfaces lying in a plane normal to the direction of free motion of said member, said member also having a preferred normal position relative to said housing;

means for supplying restoring forces on said member to return the free end of said member to said preferred position when external forces cause the rotation of said member, said means including, a first and a second light source, one of said sources disposed on each side of said plane surface portion of said member, a pickoff means mounted on said housing for detecting the angular displacement of said member about said pivot, and energizing means connected to said first and said second source, said energizing means being adapted to receive a signal from said pickoff means and to regulate the intensity of light at each said source in such a way as to maintain said member in the desired position; and light sensing means adapted to measure the intensity of light at each said light source, said measurement of light intensity being indicative of the acceleration of said housing due to an external force.

No references cited.

RALPH G. NILSON, *Primary Examiner.*

WALTER STOLWEIN, *Examiner.*

MAYNARD R. WILBUR, *Assistant Examiner.*